United States Patent [19]

Craig

[11] 4,333,513

[45] Jun. 8, 1982

[54] CATECHOL RESINS FOR THE SHELL PROCESS

[75] Inventor: Robert S. Craig, Hoffman Estates, Ill.

[73] Assignee: Acme Resin Corporation, Englewood Cliffs, N.J.

[21] Appl. No.: 240,641

[22] Filed: Mar. 5, 1981

Related U.S. Application Data

[62] Division of Ser. No. 90,388, Nov. 1, 1979, Pat. No. 4,281,090, which is a division of Ser. No. 869,407, Jan. 16, 1978, Pat. No. 4,206,262.

[51] Int. Cl.$^3$ ............................................... B22C 1/22
[52] U.S. Cl. ................................... 164/526; 264/220; 264/221
[58] Field of Search ................. 164/526; 264/220, 221; 525/501; 260/38

[56] References Cited

U.S. PATENT DOCUMENTS

| | | | |
|---|---|---|---|
| 2,706,163 | 4/1955 | Fitko | 117/72 |
| 2,856,381 | 10/1958 | McNaughtan et al. | 525/501 |
| 2,888,418 | 5/1959 | Albanese et al. | 260/28 |
| 3,004,312 | 10/1961 | Froberger | 22/193 |
| 3,471,443 | 10/1969 | Bornstein | 260/56 |
| 3,632,785 | 1/1972 | Bornstein | 260/25 |
| 3,838,095 | 9/1974 | Johnson et al. | 260/38 |
| 4,089,837 | 5/1978 | Luttinger et al. | 260/38 |

FOREIGN PATENT DOCUMENTS 598602 2/1948 United Kingdom ................ 525/501

*Primary Examiner*—Theodore E. Pertilla
*Attorney, Agent, or Firm*—Stanley M. Parmerter

[57] ABSTRACT

A resin-coated sand comprising:
(a) particles of sand coated with from about 1% to about 8%, by weight of the sand, of a novolak resin consisting essentially of about 50% to about 98% of a phenol-formaldehyde novolak resin and about 2% to about 50% of a catechol-formaldehyde novolak resin; and,
(b) a curing agent.

The sands are especially useful for forming foundry cores and molds.

5 Claims, No Drawings

CATECHOL RESINS FOR THE SHELL PROCESS

This is a division, of copending application Ser. No. 090,388, filed Nov. 1, 1979, now U.S. Pat. No. 4,281,090, issued July 8, 1981 which in turn is a division of application Ser. No. 869,407, filed Jan. 16, 1978, now U.S. Pat. No. 4,206,262, issued June 3, 1980.

BACKGROUND OF THE INVENTION

1. Field of the Invention

This invention relates to new and useful improvements in novolak resin binders, to the novel process for applying these binders to discrete, inert solid particles, to the novel composition produced thereby, and to novel processes which employ these compositions.

2. The Prior Art

Resin binders have been employed heretofore in the preparation of consolidated materials by bonding discrete inert solid particles such as sand, abrasive grit, wood chips, and a suitable binder.

The shell molding process for the production of sand mold sections for the casting of metals is well-known in the prior art. While there are many variations of this process, the process essentially comprises depositing a combination of sand and potentially thermosetting solid resin against a heated pattern such that the resin melts and cures to form a rigid shell mold section for use in the casting of metals. The resin coated sand used in the process provides free-flowing sand grains, such having a solid, non-tacky coating of resin.

The production of a shell or mold involves two basic steps; the invest and the cure step. In the first step, the resin-coated sand is dumped onto or blown against the pattern (invested) until the shell is thick enough to hold metal in a given application. The time required for this operation is called the "invest time". The faster the shell forms, the shorter the invest time can be. The rate at which the shell forms is known as the "build-up rate". The faster the build-up rate, the shorter the invest time. If faster build-up rates can be attained, faster production cycles can be run. In the second step, the uncured resin-coated sand is dumped or dropped away from the shell on bonded coated particles of sand and the resulting shell is cured. After the shell is cured, it is removed from the hot metal pattern and is ready for use. Therefore, reducing the cure time required also can accelerate the production of shell cores and molds.

Phenolic resins are known to be particularly useful in the shell molding process. For shell molding, two-step phenol-formaldehyde resins (also known as novolaks) which are potentially thermosetting are employed. Thermoplastic phenolformaldehyde novolak resins can be made potentially thermosetting by incorporating a curing agent such as hexamethylenetetramine. (Useful examples of potentially thermosetting phenolic resin-coated sands are disclosed in U.S. Pat. Nos. 2,706,163 and 2,888,418).

Foundry cores and foundry molds can be formed by the shell process. Foundry cores can also be formed in other processes which can employ one-step phenol-formaldehyde resins (also known as resoles), but such are not generally useful in the shell process.

Resin-coated sands exhibiting significantly increased build-up rate and/or cure rate in the shell process would be desirable in that such sands would permit shell cores and molds to be made at a faster rate. In this regard, the prior art shows that some effort has been made heretofore. For example, U.S. Pat. No. 3,471,443 discloses a potentially thermosetting phenol-formaldehyde novolak resin containing an aniline salt which is reported to be fast curing. While this composition may be effective, aniline salts are not desirable materials for inclusion in resin-coated sands because they are toxic and have an unpleasant pungent odor. Further, U.S. Pat. No. 3,838,095 discloses a novolak resin which includes urea to increase both the invest rate and the cure rate.

A desirable binder composition for a resin-coated sand would be a two-step novolak resin which exhibits both fast invest times and cure times.

SUMMARY OF THE INVENTION

In summary, it has been discovered that replacing a part of the phenol-formaldehyde novolak resin with a catecholformaldehyde novolak resin into sand coated with a potentially thermosetting novolak resin increases both the "build-up" rate and cure rate of the resin-coated sand. Using these novel resin-coated sands, both the invest time and cure time can be reduced when making cores and molds by the shell process. In addition, it has been found that the hot and cold tensile strengths of cores and molds made according to this invention are increased so that stronger cores and molds can be produced. Other significant advantages are noted hereinafter.

More specifically, this invention presents a resin-coated sand comprising (a) particles of sand coated with from about 1% to about 8%, by weight of the sand, of a novolak resin consisting essentially of about 50% to about 98% phenolformaldehyde novolak resin and about 2% to about 50% of catechol-formaldehyde novolak resin; and, (b) a curing agent.

DETAILED DESCRIPTION OF THE PREFERRED EMBODIMENTS

This invention presents a resin-coated sand comprising particles of sand coated with (a) from about 1% to 8%, by weight of the sand, of novolak resin consisting essentially of about 50% to about 98% of a phenol-formaldehyde novolak resin and about 2% to about 50% of a catechol-formaldehyde novolak resin, and a curing agent.

Preferred resin-coated sands especially useful in this invention are particles of sand, separate from adjacent particles, coated with from about 1% to about 8% and preferably from about 1% to about 6%, by weight, of a novolak resin comprising the above-described phenol-formaldehyde and catechol-formaldehyde novolak resin mixture. While the coating resin can be either a liquid or a solid, the coating resin is preferably solid. It is to be understood that as used herein, the terms phenol-formaldehyde novolak resin and catechol-formaldehyde novolak resin include resins produced from aldehydes other than formaldehyde, such as acetaldehyde, glyoxal, etc., as well as mixtures of aldehydes. However, formaldehyde is the preferred aldehyde.

Methods for forming these preferred free-flowing resin-coated sands are well-known in the art, and such methods can be generally followed in the practice of the invention. Further details can be found in U.S. Pat. No. 3,838,095, the entire disclosure of which is incorporated herein by reference.

A suitable phenol-formaldehyde novolak resin composition for use in this invention comprises an acid catalyzed phenol-formaldehyde resin formed by reacting phenol and formaldehyde in a molar ratio of from about 0.5 to about 0.85 mole of formaldehyde to mole of phenol in the presence of an acid catalyst; such as, for example, from about 0.4% to 0.8% of hydrochloric acid by weight of the phenol, or more when employing acids such as sulfuric or oxalic acids. The phenolic resin polymer formed in the process is conveniently brought to the desired stage of polymerization by heating the reactants, preferably at a temperature from about 35° C. to about 100° C., after which the acid catalyst may be neutralized. Water in the resulting mixture can be removed by evaporation under reduced pressure. A portion of the water can be removed to form a concentrated liquid resin product suitable for use in forming resin-coated sand, or sufficient water can be removed such that the resin is a solid at room temperature (25° C.). The solid resin can be ground to a powder or flaked and the resulting resins can be used to make the preferred resin coated sand of this invention.

Generally, the process of coating sand with resin involves placing the sand in any one of several types of mixers commonly used in foundry work. Examples of these are: the Beardsley-Piper Speed Muller and the Simpson Muller. To this sand is added from about 1% to about 8%, preferably 1% to 6%, by weight of the sand, of the resin, and a suitable amount of curing agent; for example, hexamethylenetetramine, to render the novolak resin potentially thermosetting, generally from about 8% to about 20% by weight of the resin. The sand is heated to a suitable coating temperature and mixed with resin and curing agent to coat each of the sand grains with a layer of the resin and curing agent. After the sand is coated with resin, the coated sand is cooled to room temperature, as for example, by quenching with water. The mixing is continued for a sufficient time to obtain a free-flowing product.

In accordance with this invention, a portion of the phenol-formaldehyde novolak resin is replaced by a catechol-formaldehyde novolak resin. It has been surprisingly found that incorporating the catechol-formaldehyde novolak resin in the resin-coated sand provides resin-coated sands which exhibit faster build-up rates; i.e., shorter invest times, and faster cure rates. These novel sands, therefore, are especially useful for rapidly forming molds and cores in the shell process.

It has been found that blending catechol-formaldehyde novolak resins with phenol-formaldehyde novolak resins commonly used in the shell process that the curing rate of resin-coated sand are greatly accelerated. Blends containing from about 2% to about 50% of catechol-formaldehyde novolak resin and from about 50% to about 98% of phenol-formaldehyde novolak resin are useful. A preferred formulation would include from about 15% to about 40% of a catechol-formaldehyde novolak resin and from about 60% to about 85% of a phenol-formaldehyde novolak resin. All percentages are by weight of the total novolak resin component. Generally, the introduction of any amount of catechol-formaldehyde novolak resin into the formulation will yield some benefit. However, the use of less than about 2% will result in too small an improvement to have commercial significance. If the total amount of the catechol-formaldehyde novolak resin exceeds about 50%, then it is possible that there may be a reduction in the final tensile strength of the mold or core.

The catechol-formaldehyde novolak resins should have a mole ratio of formaldehyde to catechol of about 0.5 to about 0.85. These resins are normally made by reacting catechol with formaldehyde at an acidic pH. Acid catalysts such as hydrochloric acid, sulfuric acid, oxalic acid, sulfamic acid, and Lewis acids and their mixtures may be used. The process is generally similar to that for producing a phenol-formaldehyde novolak resin, described above.

The catechol-formaldehyde novolak resin may be used as solid resins or in liquid form in the coating process. A liquid form catechol-formaldehyde novolak resin may be produced by dissolving the resin in a solvent, such as an alcohol, a ketone, an ester or mixtures thereof.

Water may be used in combination with alcohols, such as methanol, ethanol, or propanol and with ketones such as acetone, or methyl ethyl ketone to give solutions of catecholformaldehyde novolak resins useful in this invention.

These resins may be coated with any of the coating processes commonly used to produce resin-coated shell sand. Also, different types of foundry sands and sand additives may be used such as those described in U.S. Pat. No. 3,838,095.

The incorporation of the catechol-formaldehyde novolak resin into the resin-coated sand unexpectedly causes the resin to cure more rapidly and causes the resin-coated sand to buildup faster during the shell process. In addition, it has been found that cores and molds in the shell process with the novel resin-coated sand of this invention exhibit higher hot and cold tensile strengths.

Any of the refractory aggregates commonly used to make foundry cores and molds can be coated with the resin compositions of this invention. This includes silica sands, lake sands, bank sands, zircon sand, chromite sand, olivine sand and the like. Also mixtures of these may be used.

It is often the practice in the foundry art to include a variety of adjuvants in resin-coated sands, as for example, waxy release agents such as calcium stearate and bis-stearoxylamide of ethylenediamine. These are generally utilized at a level of about 2% to about 8% based on resin weight. Others include salicylic acid, clay, iron oxide and ligin-type resins. Such adjuvants can also be especially useful in the resin-coated sands of this invention.

The novel rapid process for forming molds according to this invention involves bringing the novel resin-coated sand of this invention into contact with a hot metal pattern to form a mold suitable for casting metal, curing the mold and removing the mold from the pattern. The temperatures and procedures involved in forming the molds are those generally employed in the art, as for example, as disclosed in U.S. Pat. No. 3,004,312, incorporated herein by reference. However, somewhat lower temperatures may be used.

More particularly this invention provides a process for forming foundry cores and molds comprising the steps of (1) contacting a hot pattern with a free-flowing resin-coated sand comprising (a) particles of sand coated with from about 1% to 8%, by weight of the sand, a novolak resin consisting essentially of about 50% to about 98% of phenol-formaldehyde novolak resin and about 2% to about 50% of catechol-formaldehyde novolak resin, and (b) a curing agent; (2) holding the resin coated sand against the hot pattern to bond a portion of the particles of resin-coated sand together to form a foundry mold or core of suitable thickness; (3) removing unbonded particles of resin-coated sand from bonded particles of sand forming the foundry mold or core; (4) curing the foundry mold or core, the hot pattern having a temperature of from about 300° F. to about 700° F.; and (5) removing the foundry mold or core from the pattern. Preferably, the resin-coated sand of this invention described hereinbefore, and preferably in the temperature of the hot pattern is from about 400° F. to 550° F. The pattern is preferably metal.

The following example particularly illustrates a preferred embodiment of the invention the improvement resulting therefrom.

EXAMPLE

A catechol formaldehyde novolak resin was made by adding 500 parts by weight of catechol to a stirred reactor 5 parts by weight of oxalic acid catalyst was added and the reactor heated to melt the catechol. Then 235 parts of 37% formaldehyde was added slowly. The reaction mixture was then heated at 80° C. for 2 hours. Water was removed from the resin by applying 25 inches of vacuum and heating to 137° C. The hot resin was then poured between the cooled metal rolls of a two roll mill to produce a solid flake resin.

A rapid curing coated sand of this invention was then prepared by heating 1000 g of Wedron 7020 washed and dried silica sand to 128° C. This was added to a Hobart mixer (muller) and 7.5 g of the above-described catechol flake resin and 22.5 g of a phenolic novolak flake resin (1111 Flake Phenolic Shell Resin, a resin manufactured by Acme Resin Company, a Unit of CPC International Inc.) was added and mixing was continued for 90 seconds to melt the resin and coat it onto the sand. Then 14.35 ml of a 40% solution of hexamethylenetetramine in water was added to the muller. Mulling was continued until the mixture broke up into free flowing grains of coated sand. The resin-coated sand was discharged from the muller.

A control resin-coated sand was made following the teachings of U.S. Pat. No. 3,838,095, which discloses rapid curing resin-coated sands. A resin-coated sand as described in Example II of the patent was made using that formulation: 1000 g of Wedron 7020 sand; 29.25 g of 1111 Flake Phenolic Shell Resin; 0.759 of urea; and 14.35 ml of a 40% solution of hexamethylene-tetramine in water. This coated sand is designated as the control.

The curing rates of the resin-coated sands were compared by measuring hot tensile strengths at 233° C. (450° F.) using a Dietert No. 365 Hot Shell Tensile Tester. Tests were run at 1 minute, 2 minute, and 3 minute cure times. The higher the tensile strength, the more rapid the cure rate.

| Coated Sand | Example | Control |
| --- | --- | --- |
| Hot Tensile Strength* (psi) | | |
| 1 Minute Cure | 210 | 140 |
| 2 Minute Cure | 389 | 303 |
| 3 Minute Cure | 392 | 348 |

*Strength values are average of 2 tests.

What is claimed is:

1. A process for forming foundry cores and molds comprising the steps of:
    (1) contacting a hot pattern with a free-flowing resin-coated sand comprising
        (a) particles of sand coated with from about 1% to 8%, by weight of the sand, of a novolak resin; consisting essentially of from about 50% to about 98% of a phenol-formaldehyde novolak resin and from about 2% to about 50% of a catechol-formaldehyde agent;
        (b) a curing agent;
    (2) holding the resin-coated sand against the hot pattern to bond a portion of the particles of resin-coated sand together to form a foundry mold or core of suitable thickness;
    (3) removing unbonded particles of resin-coated sand from bonded particles of sand forming the foundry mold or core;
    (4) curing the foundry mold or core, the hot pattern having a temperature of from about 300° F. to 700° F.; and
    (5) removing the foundry mold or core from the pattern.

2. The process of claim 1, wherein the curing agent is hexamethylenetetramine.

3. The process of claim 1, wherein the particles of sand are coated with from 1% to 6%, by weight of sand, or novolak resin.

4. The process of claim 1, wherein the temperature is from about 400° F. to 550° F.

5. The process of claim 1, wherein the resin-coated sand further includes from about 2% to about 6%, by weight of novolak resin, of a release agent.

* * * * *

UNITED STATES PATENT AND TRADEMARK OFFICE
CERTIFICATE OF CORRECTION

PATENT NO. : 4,333,513
DATED : June 8, 1982
INVENTOR(S) : Robert S. Craig

It is certified that error appears in the above-identified patent and that said Letters Patent are hereby corrected as shown below:

Cover Sheet, Assignee, "Acme Resin Corporation, Englewood Cliffs, N.J." should be --Acme Resin Corporation, Forest Park, Ill.--.

Column 1, line 6, "July 8, 1981" should be --July 28, 1981--.

Column 1, line 53, "phenolformaldehyde" should read --phenol-formaldehyde--.

Column 2, line 7, "unpleasent" should read --unpleasant--.

Column 2, line 17, "catecholformaldehyde" should read --catechol-formaldehyde--.

Column 2, line 32, "phenolformaldehyde" should read --phenol-formaldehyde--.

Column 4, line 15, "catecholformaldehyde" should read --catechol-formaldehyde--.

Column 4, line 40, after "8%" insert a comma.

Column 5, line 15, after "reactor" insert a period.

Signed and Sealed this

Twenty-sixth Day of October 1982

[SEAL]

Attest:

GERALD J. MOSSINGHOFF

Attesting Officer

Commissioner of Patents and Trademarks